(12) United States Patent
Shibaki et al.

(10) Patent No.: US 7,356,160 B2
(45) Date of Patent: Apr. 8, 2008

(54) METHOD OF AND APPARATUS FOR IMAGE PROCESSING

(75) Inventors: Hiroyuki Shibaki, Tokyo (JP); Noriko Miyagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 619 days.

(21) Appl. No.: 10/785,034

(22) Filed: Feb. 25, 2004

(65) Prior Publication Data

US 2004/0165747 A1 Aug. 26, 2004

(30) Foreign Application Priority Data

Feb. 25, 2003 (JP) ............................. 2003-047850

(51) Int. Cl.
G06K 9/00 (2006.01)
(52) U.S. Cl. ...................... 382/100; 382/112; 358/3.28
(58) Field of Classification Search ................ 382/112, 382/113, 114, 137, 138–140, 155, 162, 168, 382/175, 182, 193, 194–201, 232, 250, 254, 382/260, 274, 275, 276, 280, 317, 100; 271/242; 399/359; 358/1.9, 1.16, 3.28
See application file for complete search history.

(56) References Cited

U.S. PATENT DOCUMENTS

| | | | |
|---|---|---|---|
| 5,464,200 A | | 11/1995 | Nakazato et al. |
| 5,482,265 A | * | 1/1996 | Nakazato et al. ............ 271/242 |
| 5,708,949 A | | 1/1998 | Kasahara et al. |
| 5,797,074 A | | 8/1998 | Kasahara et al. |
| 5,960,246 A | * | 9/1999 | Kasahara et al. ............ 399/359 |
| 6,424,429 B1 | * | 7/2002 | Takahashi et al. .......... 358/1.16 |
| 6,556,707 B1 | | 4/2003 | Yagishita et al. |
| 6,600,828 B1 | * | 7/2003 | Kawamura ................... 382/100 |
| 6,721,459 B1 | | 4/2004 | Honsinger et al. |
| 6,724,941 B1 | * | 4/2004 | Aoyama ...................... 382/254 |
| 6,731,817 B2 | | 5/2004 | Shibaki et al. |
| 7,057,767 B2 | * | 6/2006 | Tretter ......................... 358/1.9 |
| 7,130,442 B2 | * | 10/2006 | Braudaway et al. ......... 382/100 |
| 2004/0165747 A1 | | 8/2004 | Shibaki et al. |

FOREIGN PATENT DOCUMENTS

JP 2000-278533 10/2000

(Continued)

OTHER PUBLICATIONS

U.S. Appl. No. 10/238,784, filed Sep. 11, 2002.

(Continued)

*Primary Examiner*—Seyed Azarian
(74) *Attorney, Agent, or Firm*—Oblon, Spivak, McClelland, Maier & Neustadt, P.C.

(57) ABSTRACT

An image processing apparatus embeds decision information that is information about a specific parameter, such as degree of alteration, of an image, into an image signal, and sends the image signal to an external device, such as personal computer, for storage etc. When the image processing apparatus receives the image signal with the decision information embedded in it, the image processing apparatus extracts the decision information from the image signal, determines degree of alteration of the image based on the decision information extracted, sets an image processing parameter based on the degree of alteration determined, and subjects the image signal received to image processing based on the image processing parameter set.

20 Claims, 11 Drawing Sheets

FOREIGN PATENT DOCUMENTS

| | | |
|---|---|---|
| JP | 2001-188903 | 7/2001 |
| JP | 2002-185984 | 6/2002 |

OTHER PUBLICATIONS

U.S. Appl. No. 10/287,630, filed Nov. 5, 2002.
U.S. Appl. No. 10/119,957, filed Apr. 11, 2002.
U.S. Appl. No. 10/188,133, filed Jul. 3, 2002.
U.S. Appl. No. 07/987,189, filed Dec. 8, 1992.
U.S. Appl. No. 08/038,834, filed Mar. 29, 1993.
U.S. Appl. No. 09/473,647, filed Dec. 28, 1999, Okubo et al.
U.S. Appl. No. 09/663,843, filed Sep. 15, 2000, Okubo et al.
U.S. Appl. No. 10/391,211, filed Mar. 19, 2003, Morimoto et al.
U.S. Appl. No. 10/785,034, filed Feb. 25, 2004, Shibaki et al.
U.S. Appl. No. 11/342,536, filed Jan. 31, 2006, Miyagi.
U.S. Appl. No. 11/359,385, filed Feb. 23, 2006, Miyahara et al.

* cited by examiner

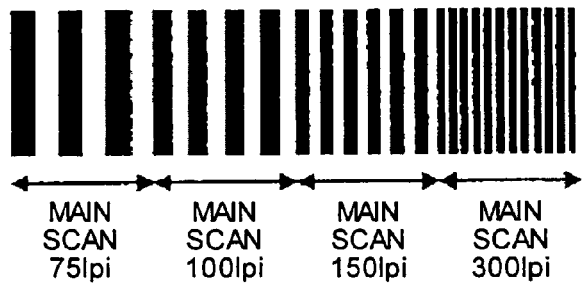
FIG. 5 A
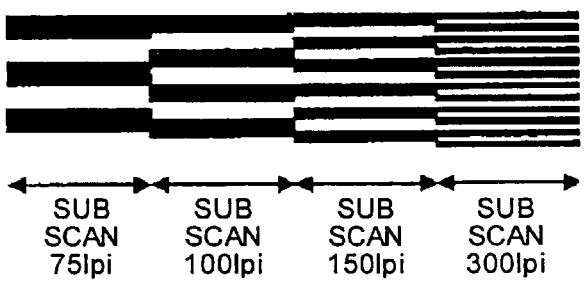
FIG. 5 B
FIG.6
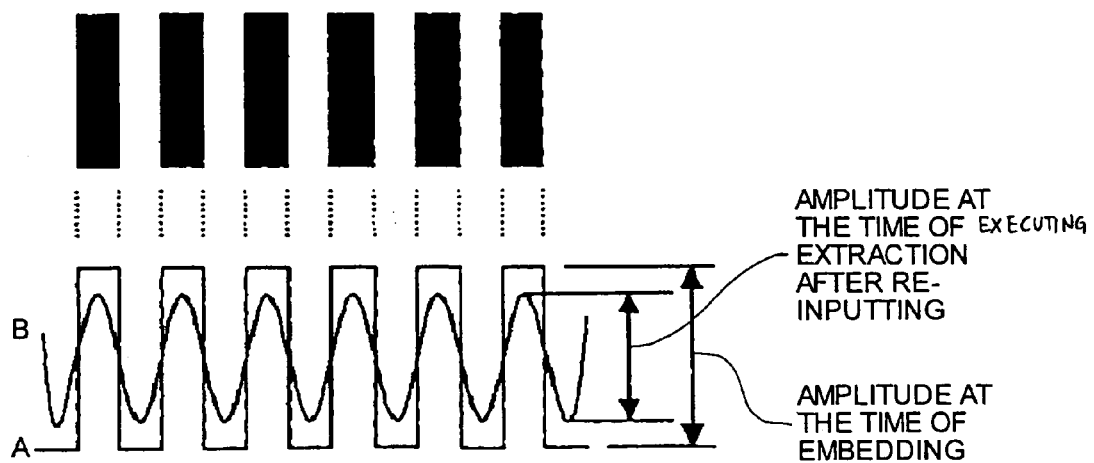

● BLACK CANDIDATE PIXEL

METHOD OF AND APPARATUS FOR IMAGE PROCESSING

CROSS-REFERENCE TO RELATED APPLICATIONS

The present document incorporates by reference the entire contents of Japanese priority document, 2003-047850 filed in Japan on Feb. 25, 2003.

BACKGROUND OF THE INVENTION

1) Field of the Invention

The present invention relates to a method of and an apparatus for image processing.

2) Description of the Related Art

It is common to store image data during image processing (e.g., digitized copy documents) in a memory section, such as a hard disk drive (HDD) in digital copying machines to use the data again. For example, if many copies of the original are to be formed, the throughput can be improved if data is read from the HDD plural times, instead of scanning the original several times. Another example is when copies of same original are to be formed after a lapse of time.

It also common to output image data stored in the HDD in a digital copying machine to an external device, such as a personal computer (PC), to archive the image data. This makes it possible to even process the image data or print the image data using a printer.

Because printers normally employ software-based printing and process every document as image data, it takes time to print the documents on the printer than on the digital copying machines and even the quality of the documents printed by the printer is inferior to that output from the digital copying machines. Particularly, the printers can not execute the black character process, which is the process to reproduce black characters with monochromatic black printing, performed by the digital copying machines.

One approach is to transfer the data from the PC to the HDD of the digital copying machines and print the document using the image processing resource of the digital copying machines. In this approach, high quality and faster printing can be achieved if the data transferred from the PC to the digital copying machines is in a format that is suitable to that employed in the digital copying machines. However, generally data is stored in the PCs in a joint photographic experts group (hereinafter, "JPEG") format or the like, or subjected to color conversion process to red, green, and blue (hereinafter, "RGB") signals or the like. Sometimes the data stored in the PC is even subjected to resolution conversion, compression or alteration of the density or color taste. If the data coming from the PC is in a format that is suitable to that employed in the digital copying machines or if the resolution of the data is inferior because of various image processing performed in the PC, the digital copying machines can not print the documents with desired image quality.

SUMMARY OF THE INVENTION

It is an object of the present invention to solve at least the problems in the conventional technology.

An image processing apparatus according to one aspect of the present invention includes an information embedding unit that embeds, into an image signal, decision information that is information about a specific parameter of an image; an image-signal transmission unit that sends to an external device the image signal with the decision information; an image-signal reception unit that receives from the external device the image signal with the decision information; an embedded-information extraction unit that extracts the decision information from the image signal received; a parameter setting unit that determines degree of alteration of the image based on the decision information extracted and sets an image processing parameter based on the degree of alteration determined; and an image processing unit that subjects the image signal received to image processing based on the image processing parameter set.

An image processing apparatus according to another aspect of the present invention includes an information embedding unit that embeds, into an image signal information about density level of a predetermined pixel of an image and information about a position where the information about density level is embedded in the image signal; an image-signal transmission unit that sends to an external device the image signal with the information about the density level and the information about the position; an image-signal reception unit that receives from the external device the image signal with the information about the density level and the information about the position; an embedded-information extraction unit that extracts the information about the density level and the information about the position from the image signal received; a density-level detection unit that detects a present density level of the predetermined pixel at a position corresponding to the information about the position based on the information about the position extracted; a parameter setting unit that determines degree of alteration of an image density of the image based on the present density level detected by the density-level detection unit and the information about the density level extracted by the embedded-information extraction unit, and sets an image processing parameter based on the degree of alteration determined; and an image processing unit that subjects the image signal received to image processing based on the image processing parameter set.

An image processing apparatus according to still another aspect of the present invention includes an information embedding unit that embeds, into an image signal a number that is a total number of pixels that have a predetermined image attribute in an image; an image-signal transmission unit that sends to an external device the image signal with the number embedded; an image-signal reception unit that receives from the external device the image signal with the number embedded; an embedded-information extraction unit that extracts the number from the image signal received; an image area separation unit that separates pixels that have the predetermined image attribute; a pixel counting unit that calculates a total of the pixels separated by the image area separation unit as a present total; a parameter setting unit that determines degree of alteration of the image based on the present total calculated by the pixel counting unit and the number extracted by the embedded-information extraction unit, and sets an image processing parameter based on the degree of alteration determined; and an image processing unit that subjects the image signal received to image processing based on the image processing parameter set.

An image processing apparatus according to still another aspect of the present invention includes an information embedding unit that embeds, into an image signal, decision information that is information about a specific parameter of an image; and an image-signal transmission unit that sends to an external device the image signal with the decision information.

An image processing apparatus according to still another aspect of the present invention includes an image-signal reception unit that receives from an external device an image signal in which decision information that is information about a specific parameter of an image is embedded; an embedded-information extraction unit that extracts the decision information from the image signal received; a parameter setting unit that determines degree of alteration of the image based on the decision information extracted and sets an image processing parameter based on the degree of alteration determined; and an image processing unit that subjects the image signal received to image processing based on the image processing parameter set.

A method of processing image according to still another aspect of the present invention includes embedding into an image signal, decision information that is information about a specific parameter of an image; sending to an external device the image signal with the decision information; receiving from the external device the image signal with the decision information; extracting the decision information from the image signal received; determining degree of alteration of the image based on the decision information extracted and setting an image processing parameter based on the degree of alteration determined; and subjecting the image signal received to image processing based on the image processing parameter set.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 5A illustrates resolution analysis patterns in the main scan direction;

FIG. 5B illustrates resolution analysis patterns in the sub scan direction;

FIG. 6 is to explain how to acquire a state (hereinafter, "saved state") in which each spatial frequency component has been saved;

DETAILED DESCRIPTION

Exemplary embodiments of an image forming apparatus according to the present invention are explained below in detail with reference to the accompanying drawings. In the following explanation an MFP is taken as an example of the image forming apparatus; however, the image forming apparatus is not limited to the MFP. The MFP is a device that has multifunction such as the functions of a digital color copier, a printer, a scanner, a facsimile, and an image server.

Figure 1:
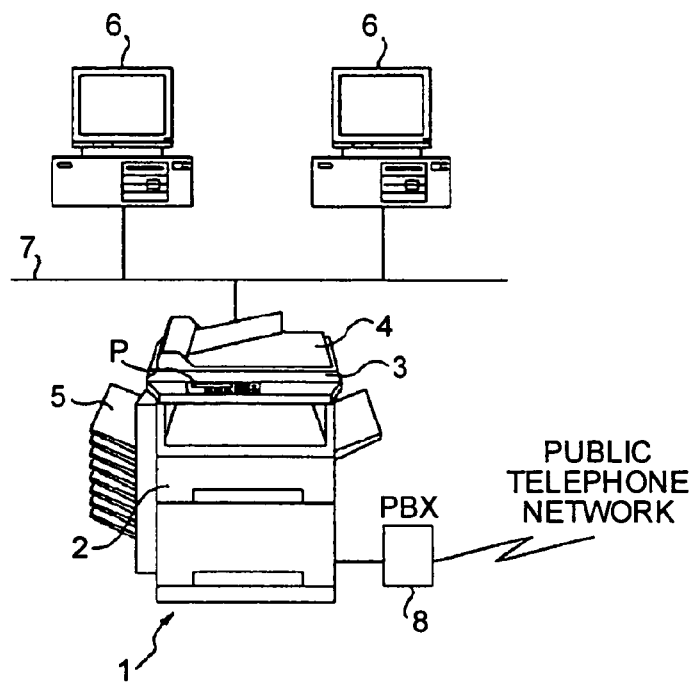
FIG. 1 is a diagram of a system that includes a multi function peripheral (MFP) that is an image processing apparatus according to a first embodiment of the present invention.

FIG. 1 is a schematic of a system that includes a MFP 1 according to a first embodiment of the present invention. The MFP 1 has a color printer 2, a scanner 3 as an image reading section, an auto document feeder (ADF) 4, an operation panel P which provides a display to an operator and performs input control on functional setting made by the operator, and a post-processing unit (sorter) 5. The MFP 1 is connected to an external device such as a personal computer (PC) 6 via a communication circuit 7 such as a local area network (LAN) or a parallel interface (I/F) or IEEE1284 I/F. When the MPF 1 is supplied with print data or print information from the PC 6 via the communication circuit 7, the MFP 1 prints out an image using the color printer 2. The MFP 1 may be connected to a public telephone network via a private branch exchange (PBX) 8 so that the MPF 1 can perform communication with a remote facsimile over the public telephone network.

The scanner 3 focuses reflected light of light, irradiated on and reflected from the surface of a document, onto a light receiving element via a mirror and a lens, though not particularly illustrated for the scanner technology is well known. The light receiving element, e.g., a charge coupled device (hereinafter, "CCD"), is located in a sensor board unit (hereinafter, "SBU") in the scanner 3. An image signal converted to an electrical signal by the CCD is converted to rgb digital image signals each of 8 bits on the SBU, and then is output to a system controller 30 (see FIG. 3) to be discussed later. The ADF 4 mounted on the scanner 3 feeds documents to the scanner 3.

Figure 2:
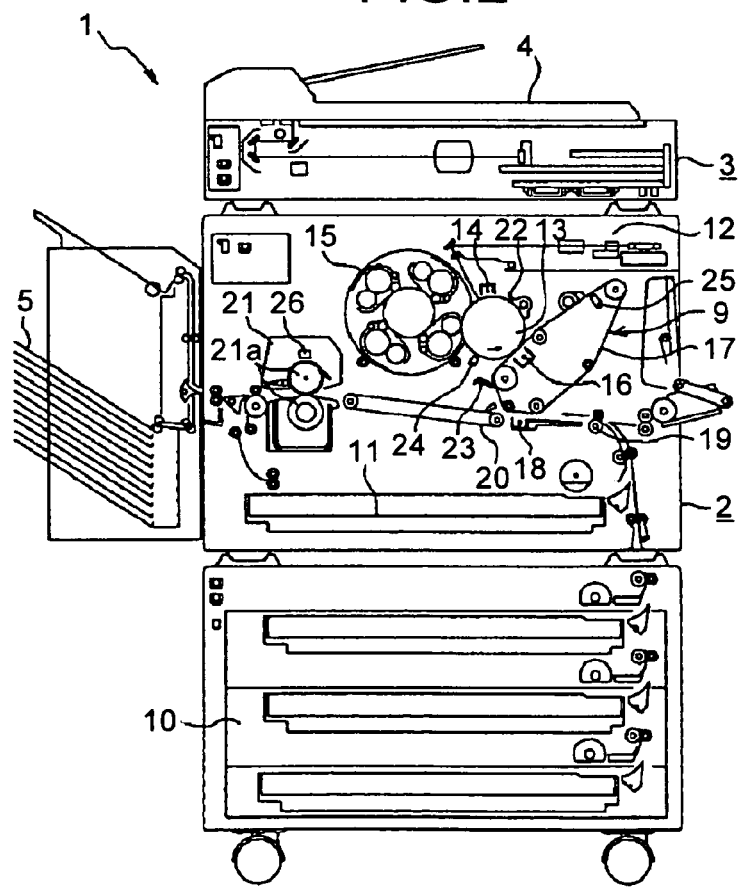
FIG. 2 is side view of the MFP according to the first embodiment.

The color printer 2 is described next. FIG. 2. is an explanatory diagram illustrating the schematic structure of the color printer 2 which constitutes a part of the MFP 1. As illustrated in FIG. 2, the color printer 2 is an electrophotographic and laser scan type color printer and comprises a printer engine 9, a sheet feeder (bank) 10, a dual paper feeder 11 and the post-processing unit (sorter) 5.

The printer engine 9 is described briefly below. Image data broken down to individual color components of black (Bk), yellow (Y), magenta (M) and cyan (C) is supplied to a laser scanning unit 12 of the printer engine 9 for each color unit. Each color unit is one image forming unit.

For monochromatic recording, image data of one of the four colors is supplied to the laser scanning unit 12. A photosensitive body 13 is rotated at a given speed and is charged by a main charger 14. The charged potential is adjusted to the proper potential by a quenching lamp (not illustrated). Then, the laser scanning unit 12 scans the charged surface with a laser modulated with the image data. As a result, a static latent image corresponding to the image data is formed on the photosensitive body 13. This static latent image is developed into a viewable image or toner image by a developer (Bk) in a rotational positioning developing unit 15, which has a developing toner of the color corresponding to the designated color (e.g., Bk) for the image formation. The toner image is transferred to a transfer belt 17 by a transfer charger 16. A transfer separation charger 18 then transfers the transferred toner image onto a transfer sheet fed by a resist roller 19. The transfer sheet carrying the toner image is fed to a fuser 21 by a conveyor belt 20. The fuser 21 fixes the toner image on the transfer sheet by heating and pressure. The image-fixed transfer sheet is discharged to the sorter 5.

The surface of the photosensitive body 13 after transfer of the toner image is finished is cleaned by a cleaner 22. After the transfer, the toner-image carried side of the transfer belt 17 is swept with a cleaning blade 23. Reference numeral 24 represents a reflection type photosensor, called a P sensor, which detects the toner density on the surface of the photosensitive body 13, 25 is a reflection type photosensor which detects a mark indicating a reference position of the transfer belt 17, and 26 is a temperature sensor which detects the temperature of a fuser roller 21a of the fuser 21.

For multi-color recording of two or more colors (the most typical type is full-color recording), the formation of a toner image on the photosensitive body 13 and the transfer of the toner image on the transfer belt 17 are repeated for the individual colors to transfer toner images of the individual colors, one over another, on the transfer belt 17, and the resultant toner images are transferred onto a transfer sheet after multiple transfers on the transfer belt 17 by the required colors are finished.

Figure 3:
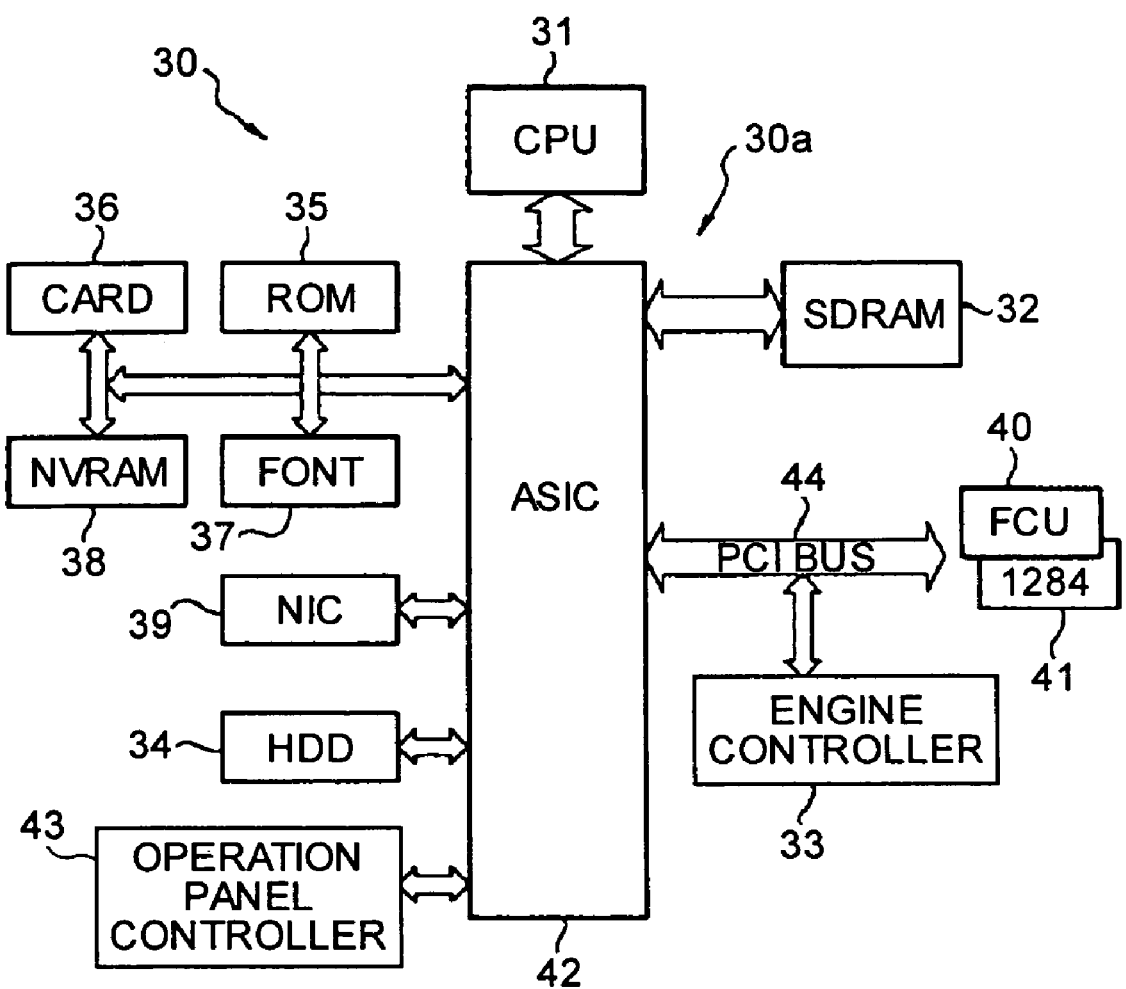
FIG. 3 is a block diagram of the MFP according to the first embodiment.

Referring to FIG. 3, the following discusses an internal circuit 30a or a circuit element incorporated in the system controller 30 which is incorporated in the MFP 1 and controls the individual sections. The internal circuit 30a of the system controller 30 has a controller application specific IC (hereinafter, "ASIC") 42 which functions as a system bus control section and image processing section. Connected to the controller ASIC 42 are a central processing unit (hereinafter, "CPU") 31 which is a main processor, a synchronous dynamic random access memory (hereinafter, "SDRAM") 32 where image data scanned by the scanner 3 is temporarily stored, an engine controller 33 for controlling the printer engine 9 to form an image of image data stored in the SDRAM 32, a hard disk drive (hereinafter, "HDD") 34 which is a storage device for storing vast amount of image data, a job history or the like, program devices, such as a read only memory (hereinafter, "ROM") 35 where a basic input output system (BIOS) is stored, a CARD 36 and a FONT 37, for controlling the entire system including the printer, facsimile and scanner, a non volatile random access memory (NVRAM) 38 which stores system log/system setting/log information and can retain data even when power is OFF, a network interface card (hereinafter, "NIC") 39 for connecting the MFP 1 to the communication circuit 7, a file controller unit (hereinafter, "FCU") 40 or a unit that performs facsimile control, an IEEE1284 41 for transferring data using plural signal lines simultaneously, and an operation panel controller 43 for controlling the operation panel P. The engine controller 33, the FCU 40 and the IEEE1284 41 are connected to the controller ASIC 42 via a peripheral component interconnect (PCI) bus 44.

With the above constitution, the system controller 30 analyzes print data or image information sent from outside (PC 6, FCU 40) and a command instructing printing, develops the print data into a bit map so that the print data can be printed as output image data, analyzes a print mode from the command and determines the operation. The system controller 30 receives the print data and command via the NIC 39 or the IEEE1284 41 and operates.

The system controller 30 can transfer print data stored in the SDRAM 32 or HDD 34, document-scanned data, output image data which is obtained by processing the print data or document-scanned data, and compressed data obtained by compressing the print data or document-scanned data to the outside (PC 6, FCU 40).

Further, the system controller 30 transfers image data scanned by the scanner 3 to the controller ASIC 42, corrects signal degradation caused by an optical system and the quantization to digital signals (signal degradation in the scanner system, deformation of scanned image data due to the scanner characteristic), and writes the corrected image data into the SDRAM 32. The image data stored in the SDRAM 32 is converted to output image data by the engine controller 33 and output to the color printer 2.

Figure 4:
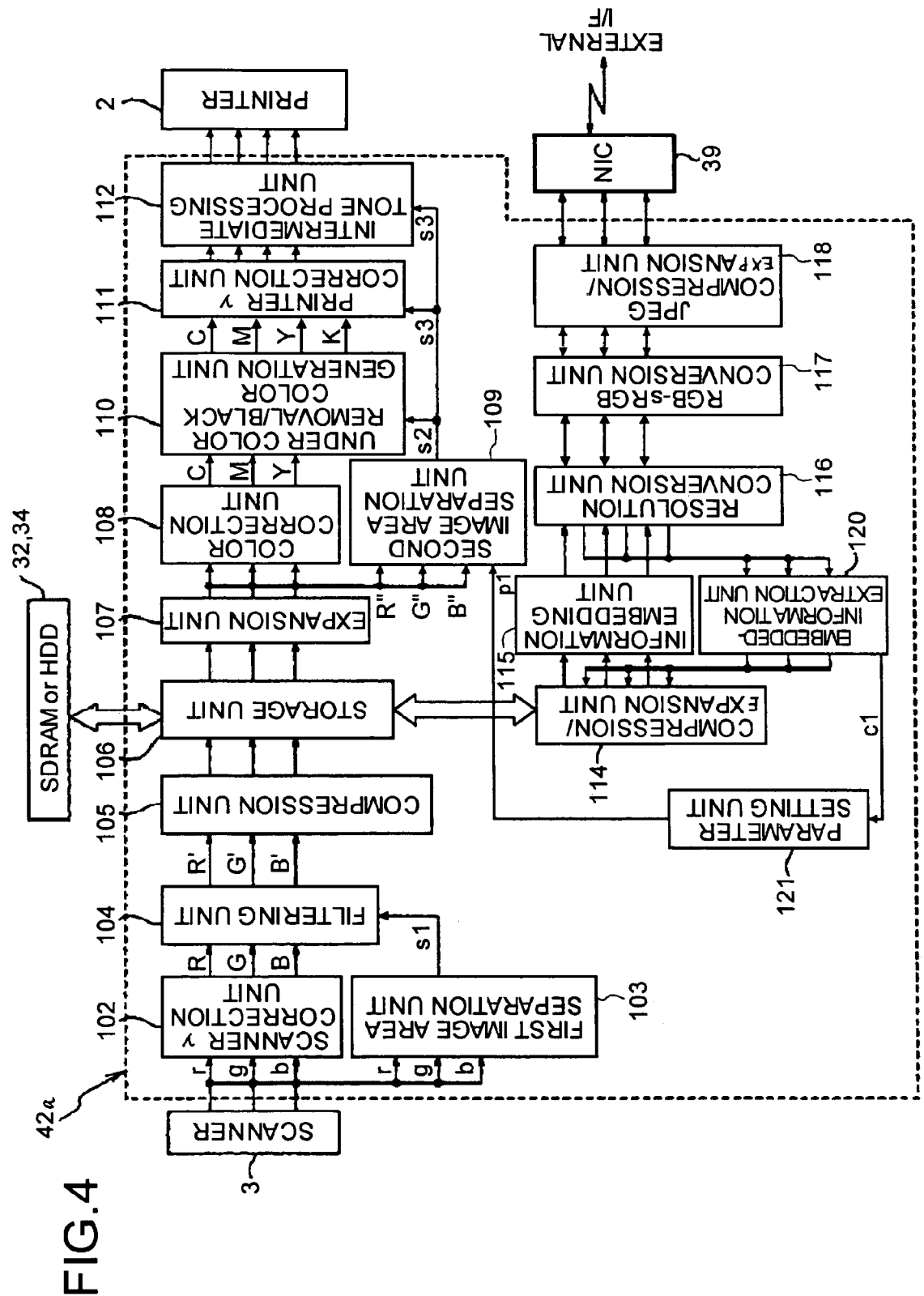
FIG. 4 is a block diagram of an image processing section of the MFP according to the first embodiment.

FIG. 4 is a block diagram of an image processing section 42a according to the first embodiment. In the image processing section 42a, rgb digital image signals each of 8 bits having linear reflectances and output from the scanner 3 are input to a scanner γ correction unit 102 and are converted to RGB signals with a linear density by a look up table (LUT). At this time, the gray balance is taken to adjust the signals in such a way that when the pixel values of R, G, and B are equal, the color becomes gray.

The rgb digital image signals each of 8 bits output from the scanner 3 are input to a first image area separation unit 103 simultaneously and a black character image area, a color character image area and a picture area other than the former two are identified. The picture area indicates a mesh image area (which is identified as a picture area with regard to a character on a mesh) or a continuous tone image area and a ground area. The first image area separation unit 103 executes an image area separation process as disclosed in, for example, Japanese Patent Publication No. 3153221 and Japanese Patent Application Laid-Open No. H5-48892. In the image area separation system, the areas are synthetically determined based on edge area detection, mesh area detection, white background area detection and color/colorless area detection, a character on the white background is determined as a character area and a mesh image containing a character on a mesh or a continuous tone image is determined as a picture area (area other than characters). For a character area, it is further determined whether the area is a character area or a color character area based on the color/colorless area detection. The first image area separation unit 103 outputs a separation signal s1 indicating a character image area to a filtering unit 104.

The filtering unit 104 performs an edge enhancement process, a smoothing process or a filtering process having the intermediate characteristic between the former two processes based on the separation signal s1 from the first image area separation unit 103 and outputs the resultant signal. More specifically, the filtering unit 104 performs uniform edge enhancement filtering on a character area (both areas of a black character and color character) and performs an adaptive filtering process on a picture area according to the result of detection by an edge quantity detection unit (not illustrated). For an area where a large edge amount is detected, such as a character in a mesh image, relatively intense edge enhancement process is performed, whereas for an area where only a small edge amount is detected, such as a mesh area, a ground portion or continuous tone area, weak edge enhancement process or smoothing process is performed.

Image signals R', G', and B' after filtering are input to a compression unit 105 where they are subjected to a predetermined a compression process. The compressed signals are then stored in the SDRAM 32 or HDD 34 by a storage unit 106. The compression process is executed by the compression unit 105 here to increase the amount of data storage in the SDRAM 32 or HDD 34.

The operation of the image processing section 42a in the normal copying process is described next. In the normal copying process, desired image signals are read from the SDRAM 32 or HDD 34 via the storage unit 106 and the read image signals are output to the printer 2 through various image processing units from an expansion unit 107 to an intermediate tone processing unit 112. The following discusses the process specifically.

The image signals read from the SDRAM 32 or HDD 34 via the storage unit 106 are expanded by the expansion unit 107 and are then output to a color correction unit 108 and a second image area separation unit 109.

The color correction unit 108 converts the RGB signals to CMY signals suitable for the color material of the printer system by masking operation or the like. While the color correction can take various methods, the embodiment employs the following masking operation:

$$C = \alpha 11 \times R + \alpha 12 \times G + \alpha 13 \times B + \beta 1$$

$$M = \alpha 21 \times R + \alpha 22 \times G + \alpha 23 \times B + \beta 2$$

$$Y = \alpha 31 \times R + \alpha 32 \times G + \alpha 33 \times B + \beta 3$$

where $\alpha 11$ to $\alpha 33$ and $\beta 1$ to $\beta 3$ are predetermined color correction coefficients to make CMY signals to be output to consist of 8 bits (0 to 255).

The second image area separation unit 109 performs image area separation again using the expanded image signals R", G", and B". The second image area separation unit 109, like the first image area separation unit 103, identifies a black character image area, a color character image area and a picture area other than the two. Here, the image signals R", G", and B" from the expansion unit 107, unlike the digital image signals rgb immediately after scanned by the scanner 3, are signals undergone scanner γ correction in the scanner γ correction unit 102 and the filtering process in the filtering unit 104. It is therefore necessary to perform image area separation on the image signals R", G", and B" using parameters different from the image area separation parameters used in the first image area separation unit 103. While a signal p1 from a parameter setting unit 121 is input to the second image area separation unit 109 in FIG. 4, the signal p1 is made invalid in the normal copying process.

The image signals from the color correction unit 108 are input to an under color removal (hereinafter, "UCR")/black color generation unit 110 to be converted to cyan, magenta, yellow, and black (CMYK) signals. More specifically, the UCR/black color generation unit 110 generates a K signal as a black component and performs UCR on the CMY signals. The UCR/black color generation unit 110 receives a black character separation result c2 from the second image area separation unit 109 and performs UCR/black color generation on a black character pixel and other pixels. The generation of the K signal and UCR with respect to a non-black character pixel are carried out as indicated by the following equations:

$$K = \text{Min}(C, M, Y) \times \beta 4$$

$$C' = C - K \times \beta 5$$

$$M' = M - K \times \beta 5$$

$$Y' = M - K \times \beta 5$$

where Min(C, M, Y) are the minimum one of the CMY signals, and, β4 and β5 are predetermined coefficients and 8-bit signals.

With respect to a black character pixel, the processes are carried out as indicated by the following equations:

$$K = \text{Min}(C, M, Y)$$

$$C' = 0$$

$$M' = 0$$

$$Y' = 0.$$

As reproduction with the K toner alone is performed for a black character pixel, a good black character quality is acquired without color adhesion or resolution reduction originated from out-of-color registration at the time of printing deviation.

The signals processed by the UCR/black color generation unit 110 are subjected to a γ correction which matches with the printer engine characteristic in a printer γ correction unit 111 and then to an intermediate tone process in intermediate tone processing unit 112. The resultant signals are output to the printer 2. In FIG. 4, the intermediate tone processing system is switched by using a separation result s3 (signal indicating a color character or black character) from the second image area separation unit 109. That is, an error spread process which is advantageous for reproduction of the sharpness of a character is performed on a pixel which has been determined as a black character or a color character while a dither process which is advantageous for graininess and tone reproduction is performed on a pixel which has been determined as a non-character such as a picture portion.

When an operator designates a plurality of copies using the operation panel P, image signals stored in the SDRAM 32 or HDD 34 are read out repeatedly by the number of sheets to reproduce an image. When the operator makes a request to plural sets of multiple documents using the operation panel P, the documents are read from the SDRAM 32 or HDD 34 in the page order and this reading is carried out by plural times to ensure sorting.

The following discusses the operation of the image processing section 42a when image signals stored in the SDRAM 32 or HDD 34 are distributed to the PC 6 as an external device from the MFP 1 and the image signals are input again to the MFP 1 from the PC 6 as the external device and are output to the printer 2.

A description is given of the operation of the image processing section 42a when the image signals stored in the SDRAM 32 or HDD 34 are distributed from MFP 1 to the PC 6 as the external device.

The image signals stored in the SDRAM 32 or HDD 34 are read through the storage unit 106, expanded by a compression/expansion unit 114, and then output to an information embedding unit 115. The information embedding unit 115 embeds decision information for the degree of alteration of an image, such as the degree of degradation of the re-input image (image input to the MFP 1 again from the PC 6 as the external device) into the image signals.

The detailed operation of the information embedding unit 115 is described below. The information embedding unit 115 embeds decision information for the degree of alteration of the spatial frequency characteristic as decision information for the degree of alteration of the image into each image signal. FIG. 5A illustrates resolution analysis patterns in the main scan direction, which represent different resolutions of 75 line per inch, 100 line per inch, 150 line per inch and 300 line per inch from the left. FIG. 5B illustrates resolution analysis patterns in the sub scan direction, which represent different resolutions of 75 line per inch, 100 line per inch, 150 line per inch and 300 line per inch from the left. That is, the information embedding unit 115 embeds those resolution analysis patterns in margin portions of an image as decision information for the degree of alteration of the spatial frequency characteristic of the image and outputs the information.

Although FIGS. 5A and 5B exemplify black and white resolution analysis patterns, lowering the black level to make a pattern of, for example, gray: 32 and white, 0, can yield similar analysis results and make the resolution analysis patterns, when transferred to the outside, less noticeable.

The resolution analysis pattern may be embedded in the form of an electronic watermark so that it is not noticeable to a user. The typical method of embedding electronic watermark information in a real space image is a method of embedding an electronic watermark by performing an arithmetic operation on digital values equivalent to the hue, lightness or the like of a pixel to embed an electronic watermark. The typical method of this type is the one disclosed in U.S. Pat. No. 5,636,292 by Digimarc Corporation, which separates a digital image to blocks and adds a predetermined watermark pattern of a combination of +1 and −1 block by block. That is, the information embedding unit 115 embeds decision information for the degree of alteration as numerical data using such a method.

It is effective in terms of the speed and extraction precision if the position where information is embedded is recorded as position information and extraction of the embedded information is carried out based on the position information at the time of executing extraction in an embedded-information extraction unit 120 to be discussed later. The position where a pattern for determining the degree of alteration of an image is embedded is embedded in a predetermined portion in an image area, e.g., the head portion, as an electronic watermark in the form of numerical data of an x coordinate value and a y coordinate value. This coordinate data is extracted from the re-input image first, then the information for determining the degree of alteration is extracted from the position indicated by the coordinates.

A plurality of methods with different durabilities and characteristics, not one type of method, may be used to embed the information. In this case, even if one embedded information is lost by one image alteration method, the degree of alteration can be determined by using information embedded by the other methods and remaining still.

An image signal in which decision information for the degree of alteration of an image (resolution analysis pattern which is information for determining the degree of alteration of the spatial frequency characteristic) is embedded by the information embedding unit 115 is converted to a low-resolution image by a resolution conversion unit 116. If the resolution of the scanner 3 in the MFP 1 is 600 dots per inch, for example, distribution with this resolution makes the amount of image data comparatively large. Therefore, the resolution of the image signal is reduced to about 150 dots per inch to 300 dots per inch before being output.

The image signal converted to a low-resolution image is converted to a device-independent image signal by a masking operation or a three-dimensional LUT or the like in an RGB-sRGB conversion unit 117, then subjected to JPEG compression in a JPEG compression/expansion unit 118. The compressed image signal is transferred via the NIC 39 to the PC 6 as the external device. Hereby, the function of the image-signal transmission unit is executed.

The resolution to be converted by the resolution conversion unit 116, whether or not to convert the image signal as an SRGB signal in the RGB-sRGB conversion unit 117 and the set value of the compression ratio in the JPEG compression/expansion unit 118 (normally, JPEG can select a high image quality mode, high compression mode, etc. by changing the parameter) can be arbitrarily designated by the operator operating the operation panel P at the time of outputting the image signal and can be subjected to a conversion process under the designated conditions.

Various modes of usage are possible for an image signal to be transferred to the PC 6 as the external device. To back up copy data, image data would return from the PC 6 directly and without being subjected to any process in most cases. When a distributed image is further distributed to, or referred to by, another user, when the user decides that the amount of data is too larger, the image may be further converted to a low-resolution image or compressed with a higher compression ratio using an image editing application or the like installed in the PC 6. That is, the image that is re-input to the MFP 1 from the PC 6 is not clear on what kind of alteration has been made by the user.

The following discusses the operation of the image processing section 42a when an image signal is input to the MFP 1 from the PC 6 as the external device and output to the printer 2.

When an image signal is re-input from the PC 6 as the external device via the NIC 39 (image-signal reception unit), the re-input image signal is expanded by the JPEG compression/expansion unit 118, and the device-independent image signal is converted to a device-dependent RGB signal in the RGB-sRGB conversion unit 117. The RGB signal is then subjected to resolution conversion to 600 dots per inch, which is the scanner resolution, in the resolution conversion unit 116 and is then input to the embedded-information extraction unit 120.

The embedded-information extraction unit 120 reads decision information for the degree of alteration of the image (resolution analysis pattern which is information for determining the degree of alteration of the spatial frequency characteristic), embedded by the information embedding unit 115 at the time the image is output to the PC 6, predicts how much the image status has been altered by various kinds of image processing, i.e., the degree of alteration, and outputs a signal c1 indicating the degree of alteration.

The detailed operation of the embedded-information extraction unit 120 is described below. The embedded-information extraction unit 120 reads information embedded by the information embedding unit 115 (resolution analysis pattern) from a predetermined position of the re-input image signal (a margin portion of the image) and analyzes how each resolution analysis pattern returned has been changed.

Referring to FIG. 6, how to acquire the saved state of each spatial frequency component is described. Plotting image data values of a resolution analysis pattern A in FIG. 6 yields a pattern B in FIG. 6. It is to be noted that the black level is 255 and the white level is 0 then. A is the plotted resolution analysis pattern at the time information is embedded, and B is the plotted resolution analysis pattern of the re-input image. If the high frequency component is attenuated or eliminated by resolution conversion or compression, the image signal is changed as indicated by the plot B, reducing the amplitude. In this example, the result of comparing the amplitude after re-inputting with the amplitude at the time of embedding is evaluated as the save ratio of the frequency component.

That is, save ratio of the frequency component=(amplitude after re-inputting)/(amplitude at the time of embedding). Plotting the save ratios at the individual measured bands yields, for example, a graph illustrated in FIG. 7.

The image signal after embedded information (resolution analysis pattern) IS extracted by the embedded-information extraction unit 120 is input to the compression/expansion unit 114 to undergo a predetermined compression process, and is then written back into the SDRAM 32 or HDD 34 via the storage unit 106.

One screen of image signals stored in the SDRAM 32 or.HDD 34 in this manner are read from the SDRAM 32 or HDD 34 via the storage unit 106 and are output to the printer 2 through various image processing units from the expansion unit 107 to the intermediate tone processing unit 112 as done in the copying process.

The second image area separation unit 109 takes such a constitution as to select the optimal parameter p1 in the parameter setting unit 121 in accordance with the signal c1 indicating the degree of alteration from the embedded-information extraction unit 120 and perform second image area separation based on the parameter p1. Hereby, the function of the image processing optimization unit is executed. When information embedded by the information embedding unit 115 (information for determining the degree of alteration of the spatial frequency characteristic) hardly needs alteration (e.g., resolution conversion or sRGB conversion has not been performed, the compression ratio of JPEG compression is relatively low and edition or the like has not been done even after the image was transferred to the outside), it indicates that the degree of alteration of the signal c1 is very small, so that the separation parameter p1 set by the parameter setting unit 121 which is the same as the separation parameter to be used in the normal copying process is output. When the image signal has been altered by resolution conversion, sRGB conversion, JPEG compression or the like and the degree of alteration is large, on the other hand, a more adequate image area separation parameter p1 is output.

Figure 7:
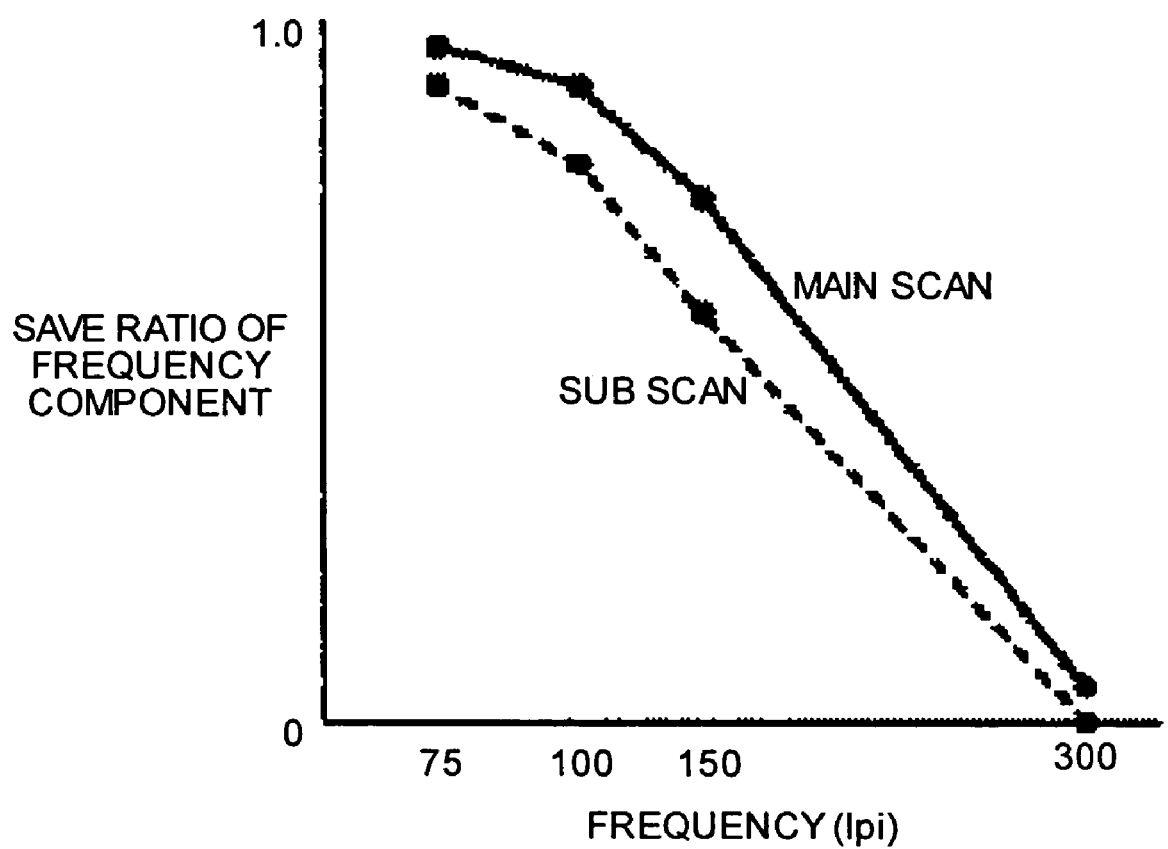
FIG. 7 is a graph of save ratio in each measured band.

With regard to a parameter for a process block of detecting character edges in image area separation, for example, the save ratio of 150 to 300 line per inch with a relatively high frequency is important. When attenuation is apparent as illustrated in FIG. 7, the normal parameter makes it hard to detect character edges so that a parameter which makes detection of character edges easier is output. When attenuation is drastic, it is difficult to execute image area separation itself and enforcing the execution of image area separation may generate multiple defects originated from a separation error. The constitution may be designed in such a way that in such a case, the image area separation process is halted.

When decision information for the degree of alteration of an image is embedded in an image signal by the information embedding unit 115 before transferring the image signal to the PC 6 as the external device and the image signal is re-input from the PC 6 as the external device, the decision information for the degree of alteration of the image embedded in the image signal is extracted, and the degree of alteration of the image is determined based on the extraction result to optimize the image processing parameter. This can permit the optimal image processing parameter to be used for the image signal which is re-input from the PC 6 as the external device, thus ensuring image reproduction with a high image quality.

In this embodiment, the parameter for the image area separation is optimized by using embedded information extracted from a re-input image. As another example of correction using information on the degree of degradation in this manner, the second filtering unit (not illustrated) may be controlled using save ratio data of the frequency component, acquired as illustrated in FIG. 7, to carry out the adequate sharpness control on the re-input image.

Although the information embedding unit 115 embeds the degree of alteration of the spatial frequency characteristic of an image as decision information for the degree of alteration of the image in this embodiment, the information is not limited to this particular type. For example, information for determining the degree of alteration of the image density may be embedded. Specifically, a density patch having the adequate density values from highlight to shadow is embedded and the density information is read from a re-input image to monitor a change in density. More specifically, density level information (density patch) and pixel position information indicating where the density level information is embedded are embedded in an image signal by the information embedding unit 115, and when the image signal is re-input from the PC 6 as the external device, the density level information (density patch) embedded in the image signal and the pixel position information indicating where the density level information are extracted by the embedded-information extraction unit 120, the density level of a pixel at the position corresponding to the extracted pixel position information is detected (density-level detection unit), and it is determined how the density level has been changed based on the present density level detected and the density level at the time of embedding based on the extracted density level information, thereby optimizing the image area separation parameter according to the change in density level. For example, the white level (ground level) is optimized with respect to the detection of the white background area which is one constituting element in image area separation or a decision threshold value at the time of detecting character edges is optimized. Further, the decision threshold value for color/colorless area detection can be optimized by embedding a color patch. Alternatively, the present embodiment is also effective to convert the density signal back to the original density signal by γ conversion (not illustrated), not by optimization of the image area separation parameter.

Further, information for determining the degree of alteration of the graininess of an image may be embedded. More specifically, it may be constituted such that the graininess of a density patch is measured to acquire the degree of deterioration of graininess, and the process parameter for the second filtering process (not illustrated) is optimized based on the degree of deterioration. The graininess can be acquired by performing fast Fourier transform (FFT) on the density patch after re-inputting of an image and then integrating visual transfer function (VTF) which is the visual characteristic of a human being.

A second embodiment of the present invention is described below referring to FIGS. 8 to 11. To avoid the redundant description, like reference numerals are given to those components which are like corresponding components of the first embodiment. This embodiment differs from the first embodiment in the structure of the image processing section.

Figure 8:
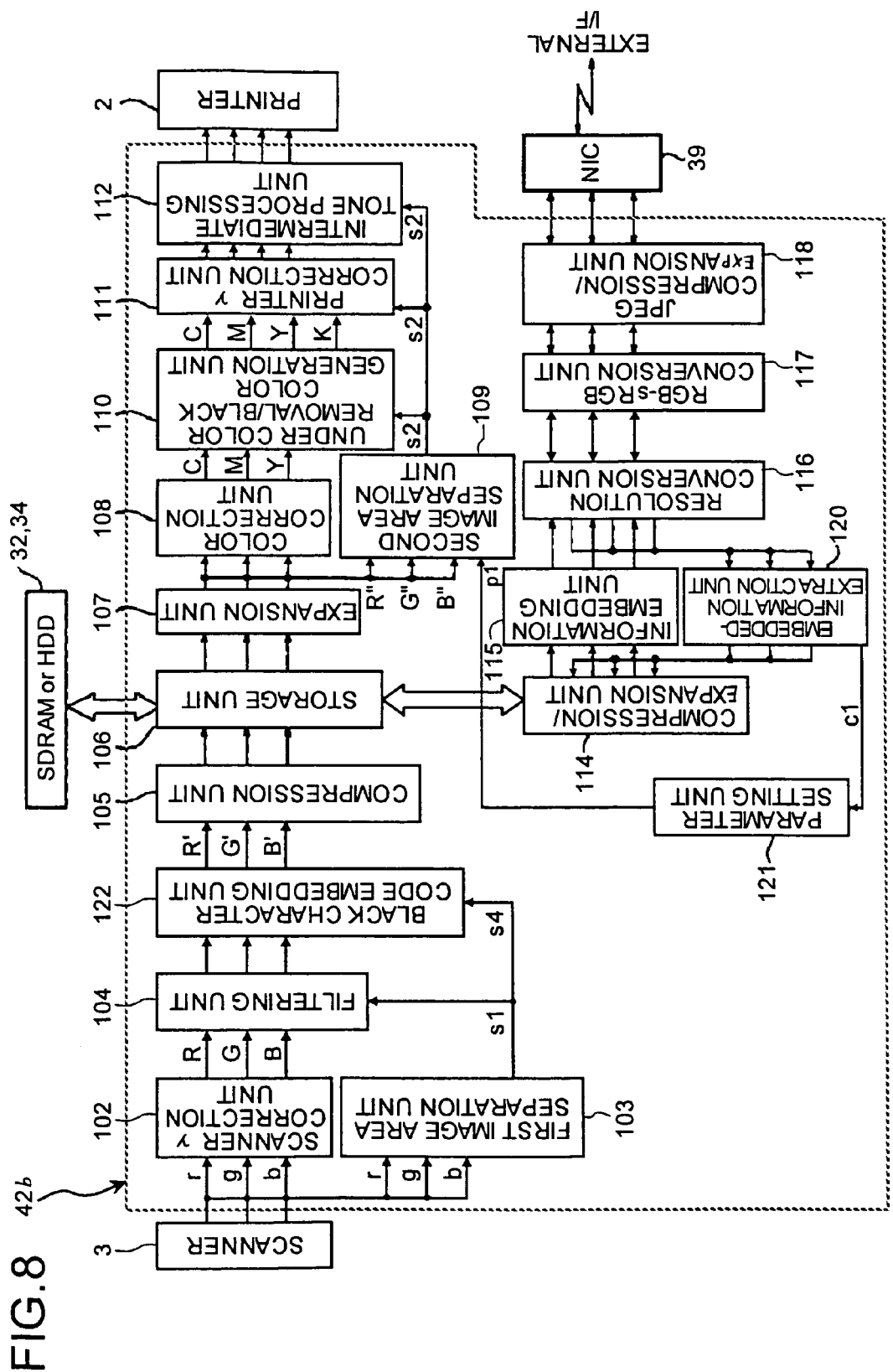
FIG. 8 is a block diagram of an image processing section in an MFP according to a second embodiment of the present invention.

FIG. 8 is a block diagram of an image processing section 42*b* according to the second embodiment. This image processing section 42*b* differs from the image processing section 42*a* of the first embodiment in that a black character code embedding unit 122 is provided to embed a separation signal indicating a black character image area (hereinafter, "black-character separation signal"), which is detected by the first image area separation unit 103, into an image signal, the resultant image signal is stored in the SDRAM 32 or HDD 34, the image signal stored is read out again and the black-character separation signal is extracted by the second image area separation unit 109 with a simple structure and is used in UCR, black color generation or the like in the UCR, black color generation unit 110.

The second image area separation unit 109 has a simple structure and it can be realized at a low cost. This feature is achieved because the black character code embedding unit 122 at the preceding stage performs a process of embedding a black-character separation signal in an image signal beforehand. The details are given below.

As the description of the components up to the filtering unit 104 is the same as that of the first embodiment, it is not repeated. The image signal after filtering in the filtering unit 104 is input to the black character code embedding unit 122.

Figure 9:
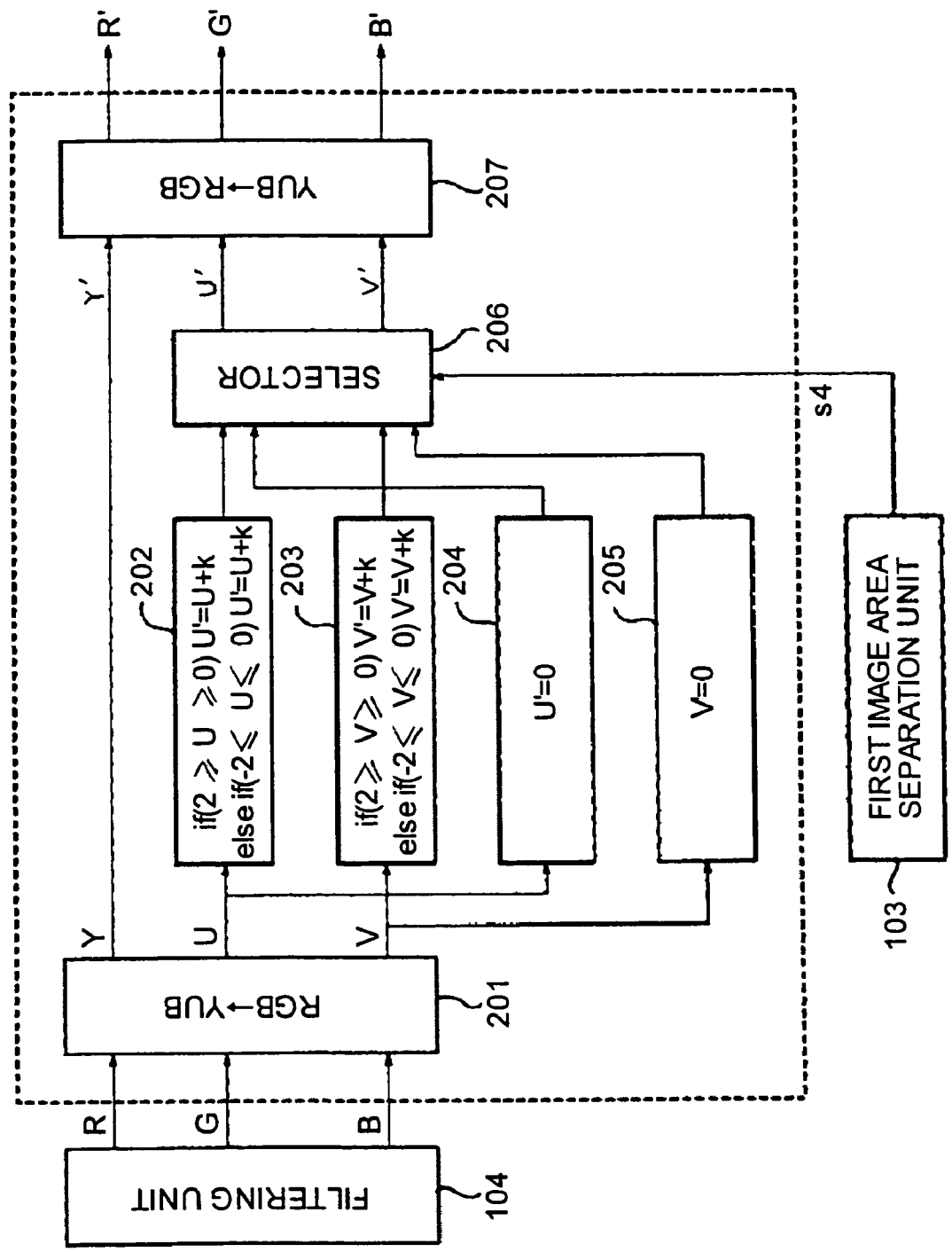
FIG. 9 is a block diagram of a black character code embedding unit in the image processing section in the second embodiment.

FIG. 9 is a functional block diagram illustrating the structure of the black character code embedding unit 122. As illustrated in FIG. 9, an input RGB signal is converted to a YUV signal of the luminance color difference signal by an RGB-to-YUV conversion block 201. Here, RGB-to-YUV conversion is carried out as follows:

$$Y=(R+2G+B)/4$$

$$U=(R-G)/2$$

$$V=(B-G)/2.$$

In the YUV signal, the Y signal represents the luminance, and the U and V signals represent color saturation. To simplify and speed up the arithmetic operation, this embodiment uses the conversion equations to perform conversion with a coefficient of power of 2 as indicated in the above equations. As indicated in the equations, for a colorless state or R=G=B, the conversion equations set both the values of U and V to 0.

Subsequently, blocks 202 to 205 which convert the color saturation components change the color components with respect to the converted YUV signal. The block 204 is a discoloring unit that outputs the U component as 0, and the block 205 likewise is a discoloring unit that outputs the V component as 0. By way of comparison, the block 202 is a coloring unit that adds a predetermined value k to U and outputs the result when the value of U is 0 or greater and equal to or less than a predetermined value (2, as an example), and subtracts k from U and outputs the result when the value of U is negative and equal to or greater than a predetermined value (−2). It is desirable that k be an adequate value which is small enough to recognize a color change visually but which can be recognized as a color pixel sufficiently by the second image area separation unit 109 at the subsequent stage. Likewise, the block 203 performs colorization on V and outputs the result.

The Y signal is output to a selector 206 without undergoing any process. The selector 206 performs controls the selector based on a black-character separation signal s4 from the first image area separation unit 103. That is, the selector 206 selects the outputs from the discoloring units 204 and 205 when the pixel is a black character pixel and selects the outputs from the coloring units 202 and 203 when the pixel is a non-black character pixel.

Next, Y, U, and V signals are converted to R', G', and B' signals with controlled color components and output by a block 207 which performs reverse conversion from YUV to RGB. The followings are YUV-to-RGB conversion equations:

$$G=Y-(2U+2V)/4$$

$$R=2U+G$$

$$R=2V+G.$$

The black character code embedding unit 122 with such a structure converts a black character area pixel to a pixel value which provides R=G=B or converts a non-black character area pixel to a pixel value which does not provide R=G=B, and embeds the value in an image signal. Then, the second image area separation unit 109 at the subsequent stage can easily specify a pixel in a black character area by detecting a pixel with R=G=B embedded in the image signal.

As the coloring units 202 and 203 colorize a pixel in a non-black character only when the signal of the pixel is colorless or very close to colorless, it does not give impression to the user that the color has changed.

The image signals R', G', and B' processed by the black character code embedding unit 122 are input to the compression unit 105 to undergo a predetermined compression process after which the signals are stored and saved in the SDRAM 32 or HDD 34 via the storage unit 106.

The following discusses the operation of the image processing section 42b in the normal copying process. In the normal copying process, desired image signals are read out from the SDRAM 32 or HDD 34 via the storage unit 106 and are output to the printer 2, passing through various image processing units from the expansion unit 107 to the intermediate tone processing unit 112.

The image signals read out from the SDRAM 32 or HDD 34 via the storage unit 106 are expanded by the expansion unit 107 and are then output to the color correction unit 108 and the second image area separation unit 109.

Figure 10:
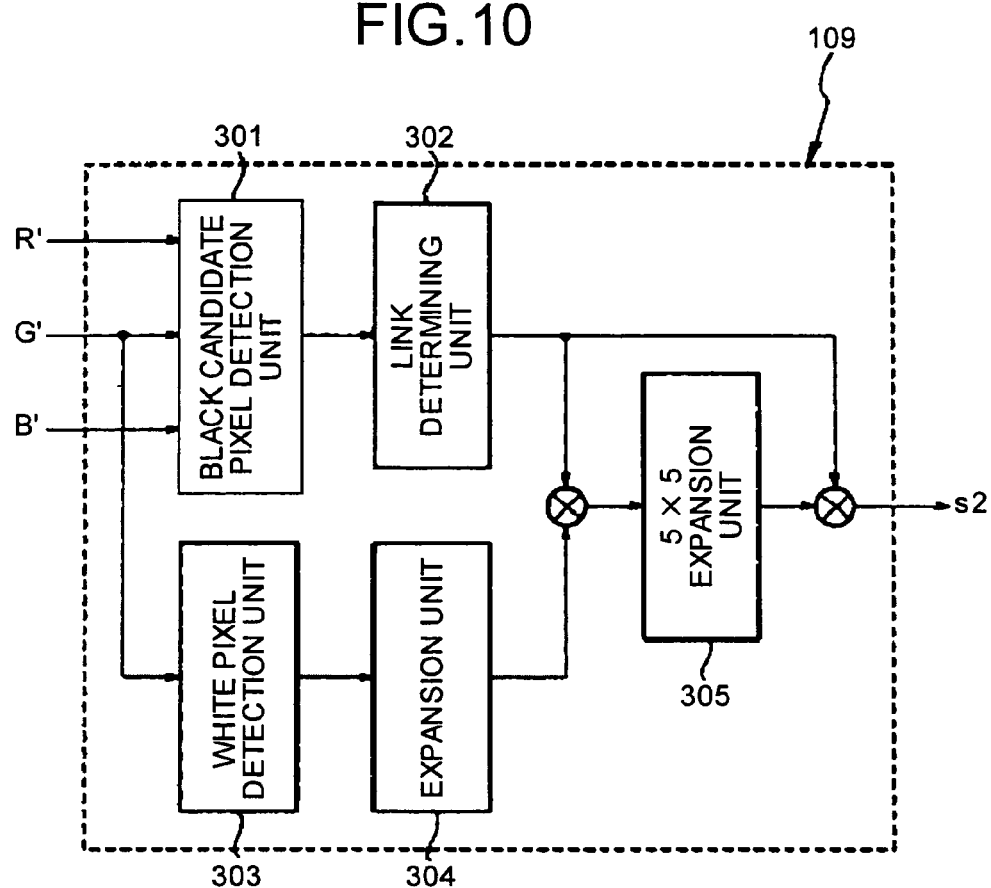
FIG. 10 is a functional block diagram illustrating the structure of a second image area separation unit in the image processing section in the second embodiment.

The second image area separation unit 109 is described below. Particularly, a method for re-extraction of a black character pixel by the second image area separation unit 109 is discussed below. FIG. 10 is a functional block diagram illustrating the structure of the second image area separation unit 109. As illustrated in FIG. 10, the second image area separation unit 109 performs image area separation again by using image signals R", G", and B" after expansion.

First, a black candidate pixel detection unit 301 determines whether or not, for the image signals R", G", and B", target pixels are R=G=B and G>th1 (where th1 is a density threshold value for determining the black level), and outputs 1 as the black candidate pixel when it is true. A black pixel with a density equal to or higher than a predetermined density is detected in this manner.

Figure 11:
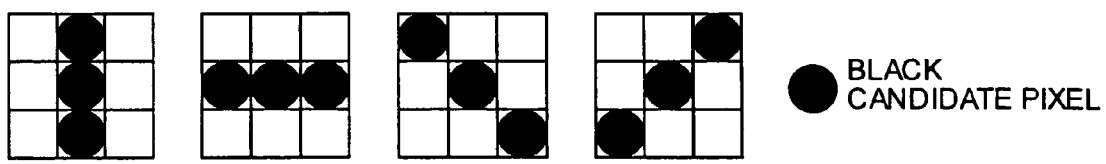
FIG. 11 is an explanatory diagram illustrating a linkage decision pattern used in pattern matching.

Subsequently, a link determining unit 302 performs pattern matching based on a pattern as illustrated in FIG. 11. From the property of character images, a black character identification signal does not exist, isolated, in the form of one dot or two dots. A character has such a property that continuous black pixels are laid out in continuous white pixels. For example, the image area separation unit as disclosed in, for example, Japanese Patent Publication No. 3153221 employs the pattern matching that uses the property. It is affirmative to say that if such detection is performed at the preceding stage, no black pixels would exist, isolated, in a black character portion. In the example illustrated in FIG. 11, therefore, pattern matching is carried out using a linkage decision pattern of 3×3 pixels to detect three black candidate pixels exist linked one another in any of the vertical direction, horizontal direction and oblique direction. Pixels with R=G=B may be generated due to the compression-originated degradation or the like. If pixels with R=G=B generated due to degradation are isolated, they can be eliminated by determining the linkage. As a pixel of interest is the center one of the 3×3 pixels in linkage decision, one black pixel falls off at an end point of a line or a corner of lines or a curve. However, it does not matter because the pixel is detected as a black character finally through a 5×5 expansion process at the subsequent stage with respect to black edges on the white background. As the linkage decision is performed that way, pixels with R=G=B which are dotted in a picture are not determined erroneously as a black character.

In the second image area separation unit 109 according to this embodiment, as illustrated in FIG. 10, the detection accuracy is further improved by a white pixel detection unit 303. As described above, a black character area indicates a black character on the white background, so that white pixels can be said to be around a black character pixel and this characteristic is used. The white pixel detection unit 303 determines whether or not R=G=B and G<th2 (where th2 is a density threshold value for determining the white level) and outputs 1 as a white pixel when it is true.

Further, the white pixel that has been detected by an expansion unit 304 is subjected to 3×3 expansion and the logical product of the result and a signal from the link determining unit 302 is obtained. Through 3×3 expansion, the white pixel becomes an area which is one pixel expanded from the original white pixel, and a black pixel area adjoining to the white background can be detected by performing an AND operation on the white pixel and the black candidate pixel. A black group similar to a black character, which is dotted in a picture, does not have white pixels around, it can be eliminated here.

The signal from which a pixel with R=G=B other than a black character has been removed is expanded to a black character area having a width of five dots by a 5×5 expansion unit 305. Further, a black character area sticking out on the white background side (by two dots) are eliminated by acquiring the logical product of the signal and the signal from the link determining unit 302.

A black character separation signal s2 detected in the manner is an area having a 3-dot width in the contour portion of a black character on the white background and is output to be used in a process performed at the subsequent stage.

As the description of the processes at and following the color correction unit 108 is the same as that of the first embodiment, it is not repeated.

The following discusses the operation of the image processing section 42b when image signals stored in the SDRAM 32 or HDD 34 are distributed to the PC 6 as an external device from the MFP 1 and the image signals are input again to the MFP 1 from the PC 6 as the external device and are output to the printer 2.

The image signals stored in the SDRAM 32 or HDD 34 are read through the storage unit 106, expanded by a compression/expansion unit 114, and then output to an information embedding unit 115. The information embedding unit 115 embeds information for enhancing the re-extraction precision for a black character code in the second image area separation unit 109 into the image signal as decision information for the degree of alteration of the image.

The detailed operation of the information embedding unit 115 is described below. The information embedding unit 115 embeds information on a black character area pixel number, detected with respect to the entire image or a predetermined area by the first image area separation unit 103, into the image signal as embedded information. The typical method of embedding electronic watermark information in a real space image is a method of embedding an electronic watermark by performing an arithmetic operation on digital values equivalent to the hue, lightness or the like of a pixel to embed an electronic watermark. The typical method of this type is the one disclosed in U.S. Pat. No. 5,636,292 by Digimarc Corporation, which separates a digital image to blocks and adds a predetermined watermark pattern of a combination of +1 and −1 block by block. That is, the information embedding unit 115 embeds the black character area pixel number information as numerical data using such a method.

It is effective in terms of the speed and extraction precision if the position where information is embedded is recorded as position information and extraction of the embedded information is carried out based on the position information at the time of executing extraction in an embedded-information extraction unit 120 to be discussed later. The position where the black character area pixel number information is embedded is embedded in a predetermined portion in an image area, e.g., the head portion, as an electronic watermark in the form of numerical data of an x coordinate value and a y coordinate value. This coordinate data is extracted from the re-input image first, and then the black character area pixel number information is extracted from the position indicated by the coordinates.

As the description of the resolution conversion unit 116, the RGB-sRGB conversion unit 117 and JPEG compression/expansion unit 118 is the same as that of the first embodiment, it is not repeated. The image signal that has undergone JPEG compression in the JPEG compression/expansion unit 118 is transferred to the PC 6 as the external device via the NIC 39. Hereby, the function of the image-signal transmission unit is executed.

The following discusses the operation of the image processing section 42b when an image signal is input to the MFP 1 from the PC 6 as the external device and output to the printer 2.

When an image signal is re-input from the PC 6 as the external device via the NIC 39 (image-signal reception unit), the re-input image signal is expanded by the JPEG compression/expansion unit 118, and the device-independent image signal is converted to a device-dependent RGB signal in the RGB-sRGB conversion unit 117. The RGB signal is then subjected to resolution conversion to 600 dots per inch, which is the scanner resolution in the resolution conversion unit 116 and is then input to the embedded-information extraction unit 120.

The embedded-information extraction unit 120 reads information (black character area pixel number information) embedded by the information embedding unit 115 at the time the image is output to the PC 6, and outputs the signal c1 indicating the black character area pixel number information. This black character area pixel number information can be read from a re-input image if it has been embedded in the form of an electronic watermark which is resistive to compression and resolution conversion.

The image signal after embedded information (black character area pixel number information) is extracted by the embedded-information extraction unit 120 is input to the compression/expansion unit 114 to undergo a predetermined compression process, and is then written back into the SDRAM 32 or HDD 34 via the storage unit 106.

One screen of image signals stored in the SDRAM 32 or HDD 34 in this manner are read from the SDRAM 32 or HDD 34 via the storage unit 106 and are output to the printer 2 through various image processing units from the expansion unit 107 to the intermediate tone processing unit 112 as done in the copying process.

The second image area separation unit 109 takes such a structure as to select the optimal parameter p1 in the parameter setting unit 121 in accordance with the signal c1 indicating the black character area pixel number information from the embedded-information extraction unit 120 and perform second image area separation based on the parameter p1.

The black character code re-extraction section in the second image area separation unit 109 tries re-extraction of a black character code using the normal parameter. The number of pixels that have the re-extracted black character code is counted (hereinafter, "detection count"), the detection count is compared with the previous pixel number information (hereinafter, "original count) and if they are approximately the same, re-extraction of the black character code is executed using this parameter. Hereby, the function of the pixel counting unit is executed. If the detection count is less than the original count, the parameter for re-extraction of a black character code is changed to a parameter which makes it easier to detect a black character. Specifically, the black-level determining threshold value th1 is reduced and the white-level determining threshold value th2 is increased. The detection count is obtained again based on the changed parameter and is compared with the original count again. Hereby, the function of the pixel counting unit is executed. If the comparison results are approximately the same, the process is carried out using this parameter. A black character area of about the same level as the original one can be re-extracted by comparing the counts and changing the parameter in this manner, so that image reproduction with the optimal black character quality guaranteed can be executed even if an image is altered in the resolution conversion unit 116, the JPEG compression/expansion unit 118 and/or the PC 6 as the external device.

Figure 12:
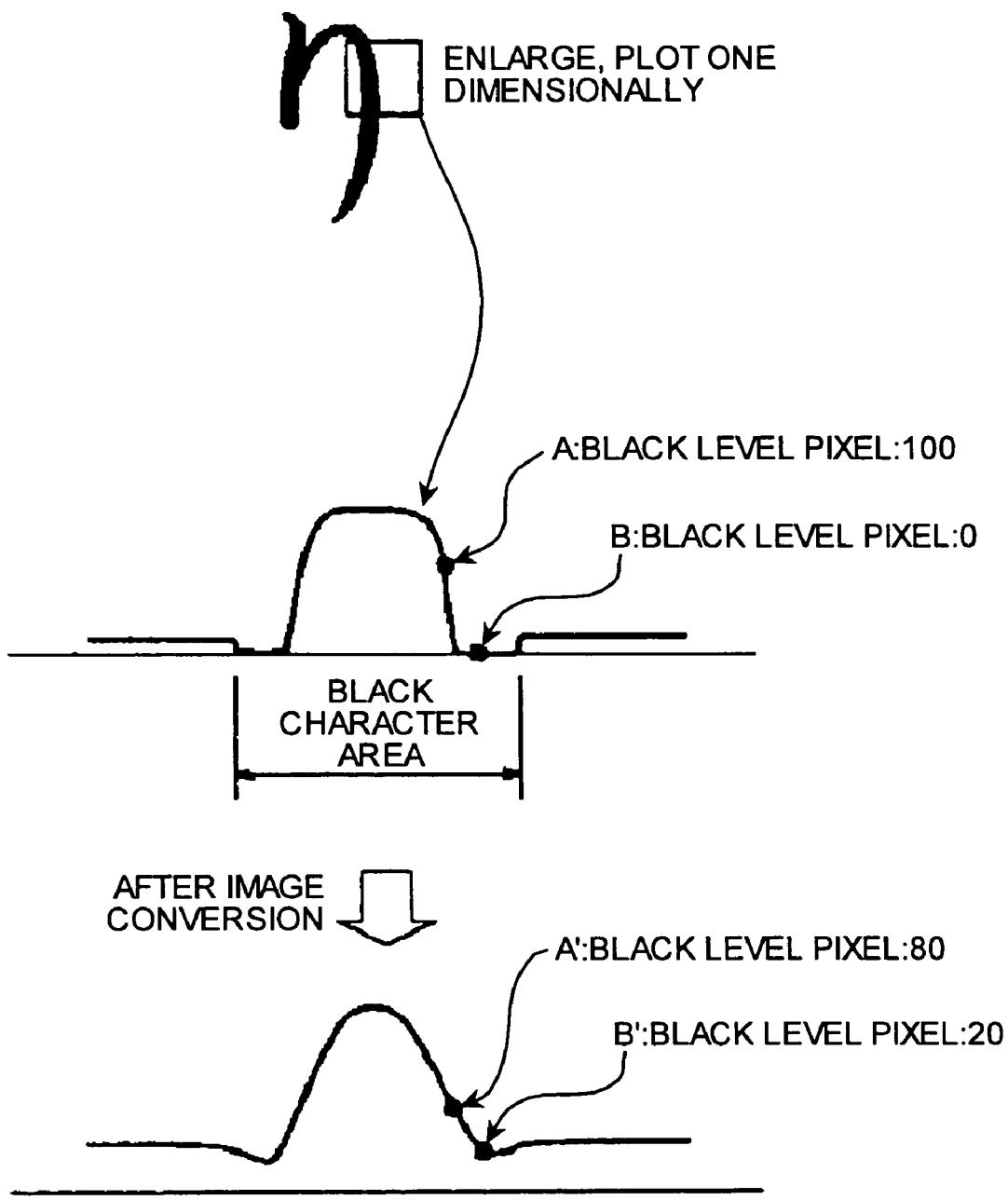
FIG. 12 is an explanatory diagram illustrating changes before and after image conversion, such as resolution conversion.

A specific process in the image processing section 42b is described below. In the re-extraction block for a black character code in the second image area separation unit 109, it is very important to find how the black level and white level of an image have been altered. This is because the status to be decided varies depending on the black-level determining threshold value th1 and the white-level determining threshold value th2. FIG. 12 is an explanatory diagram illustrating changes before and after image conversion, such as resolution conversion. FIG. 12 illustrates a part of a black character on the white background enlarged and illustrates a change in density in the main scan (horizontal) direction. In the area that is determined as a black character area in the first image area separation unit 103, a filtering process for edge enhancement is performed by the filtering unit 104. With edge enhancement done, an edge portion has a sharp density change and negative enhancement is performed even on the background area of the outline of a black character, a white spot is generated. If the character is on the white background, this white spot does not raise any problem and a white-spot suppressing process or the like is not particularly needed. In this image, what is determined as a black level pixel by the second image area separation unit 109 at the subsequent stage is a point A and what is determined as a white level pixel is a point B. Here, the black level pixel has a value of 100 and the white level pixel has a value of 0. When re-extraction of a black character code is executed by the second image area separation unit 109 at the subsequent stage, therefore, it is sufficient that the black-level determining threshold value th1 is about 90 and the white-level determining threshold value th2 is about 10, and it is assumed that those threshold values are used in the normal copying process.

As data transferred to the PC 6 as the external device is output again, the image is altered and output by compression, resolution conversion, image conversion of color space or the like. In the re-input image, the black level pixel is changed to 80 and the white level pixel is changed to 20. If the aforementioned black-level determining threshold value th1 and white-level determining threshold value th2 are used directly, therefore, white pixels cannot be detected and the character cannot be determined as a black character. If the threshold values are changed according to the changed density level, such as changing the black-level determining threshold value th1 to 70 from 90 or changing the white-level determining threshold value th2 to 30 from 10, detection equivalent to that in the copying process is possible even when image signals stored in the SDRAM 32 or HDD 34 are distributed to the PC 6 as the external device and are again input to the MFP 1 from the PC 6 as the external device and output to the printer 2.

The image processing section 42b selects a white level pixel and a black level pixel from the peripheral portion of a black character as representative pixels and embeds pixel values corresponding to the coordinate information or the pixel position information of the selected pixels into the image as an electronic watermark. The image processing section 42b extracts the coordinate information of each of the black level pixel and white level pixel from the re-input image and checks the pixel values at the extracted coordinates in the re-input image. They are the value of the black level pixel and the value of the white level pixel after image alteration. As the pixel values before alteration are also embedded as numerical data, their coordinate information is re-extracted from the image. Through the process discussed above, the values before alteration and the values after alteration can be known. This makes it possible to monitor a change in black level or white level.

Those pixel values are output to the parameter setting unit 121. The parameter setting unit 121 optimizes the black-level determining threshold value th1 and the white-level determining threshold value th2 in accordance with a change in pixel level in the manner, and outputs the optimal threshold values to the second image area separation unit 109. The second image area separation unit 109 uses the designated parameters to be able to adequately re-extract a black character code (black character separation result) so that black character reproduction with a high image quality becomes possible.

Besides the example, the pixel value of a background-level pixel and pixel position information may be embedded, the degree of alteration of the background level may be detected from the re-input image, and the background level may be adjusted by a density correction unit (not illustrated).

Before an image signal is transferred to the PC 6 as the external device, the total number of pixels belonging to a predetermined image attribute is embedded into the image signal by the information embedding unit 115, and when the image signal is re-input from the PC 6 as the external device, it is determined how the image has been altered based on the total number of pixels belonging to the predetermined image attribute embedded in the extracted number of pixels at the time of embedding and the present number of pixels calculated in the second image area which functions as the pixel counting unit, thereby optimizing the image processing parameter. This can allow the optimal image processing parameter to be used for the image signal re-input from the PC 6 as the external device, and thus ensure image reproduction with a high image quality.

A third embodiment of the present invention is described below referring to FIG. 13. To avoid the redundant description, like reference numerals are given to those components which are like corresponding components of the first embodiment or the second embodiment.

Figure 13:
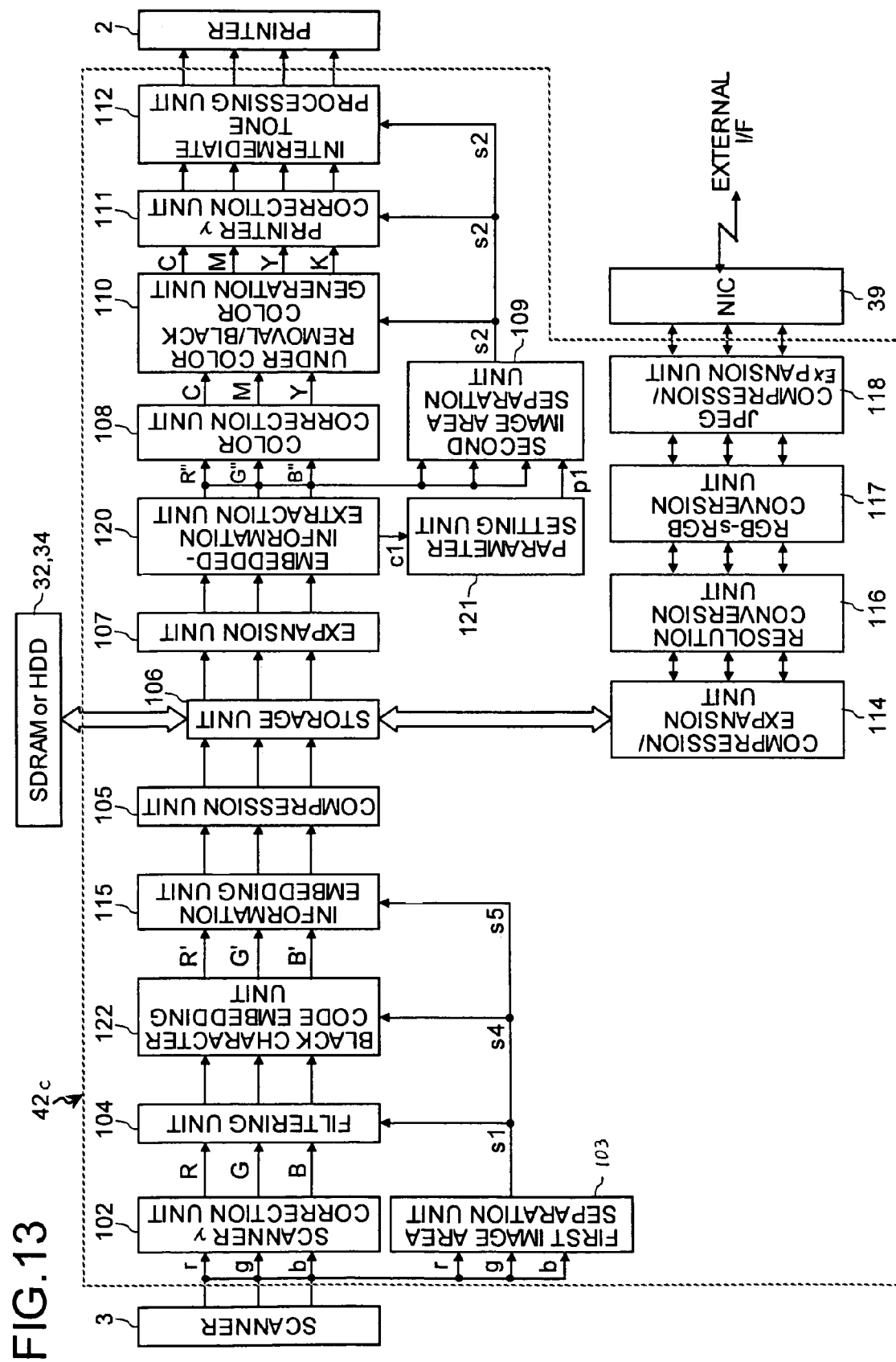
FIG. 13 is a block diagram illustrating the structure of an image processing section in an MFP according to a third embodiment of the present invention.

FIG. 13 is a block diagram of an image processing section 42c according to the third embodiment. The image processing section 42c differs from the image processing sections of the first embodiment and the second embodiment in that the information embedding unit 115 is arranged at the preceding stage of the storage unit 106 and the embedded-information extraction unit 120 is arranged at the subsequent stage of the storage unit 106. In this case, the structural difference is of such a level that compression by the compression unit 105 and expansion by the expansion unit 107 are performed on an information-embedded signal, and does not matter at all.

In the image processing section 42c, a separation result s5 is input to the information embedding unit 115 from the first image area separation unit 103. The information embedding unit 115 embeds information in an image according to the separation result s5. As embedding information is to alter the original image, it is desirable to embed information in an area where a user cannot recognize the alteration, as much as possible. It is desirable to embed information in a portion where a density change relatively exists, rather than in the background or the like. It is further desirable such a portion is an image area, such as a mesh image, where the density value is locally changed. The signal s5 in this embodiment indicates a mesh area and is embedded in a mesh image area.

The image processing section 42c embeds information with respect to a signal before being stored in the SDRAM 32 or HDD 34, and those flows are designed in such a way that alteration made in the format conversion at the time of outputting the signal to the PC 6 as the external device and alteration made in the PC 6 as the external device are both detected as the degree of alteration of the image. This ensures optimization of the parameter in a process at the subsequent stage (copying process after the storage unit 106) in the form including alteration made by various format conversion selected by a user, so that the parameter should be determined in a unitary manner.

Because the degree of alteration can be determined in such a form that both the image alteration which is made in the resolution conversion, compression, etc. which is carried out at the time the image is transferred to the PC 6 as the external device and the image alteration which is done in the PC 6 as the external device are reflected, reproduction with a high image quality can be realized with the parameter set unitarily.

A fourth embodiment of the present invention is described below referring to FIG. 14. To avoid the redundant description, like reference numerals are given to those components which are like corresponding components of the first to third embodiments.

Figure 14:
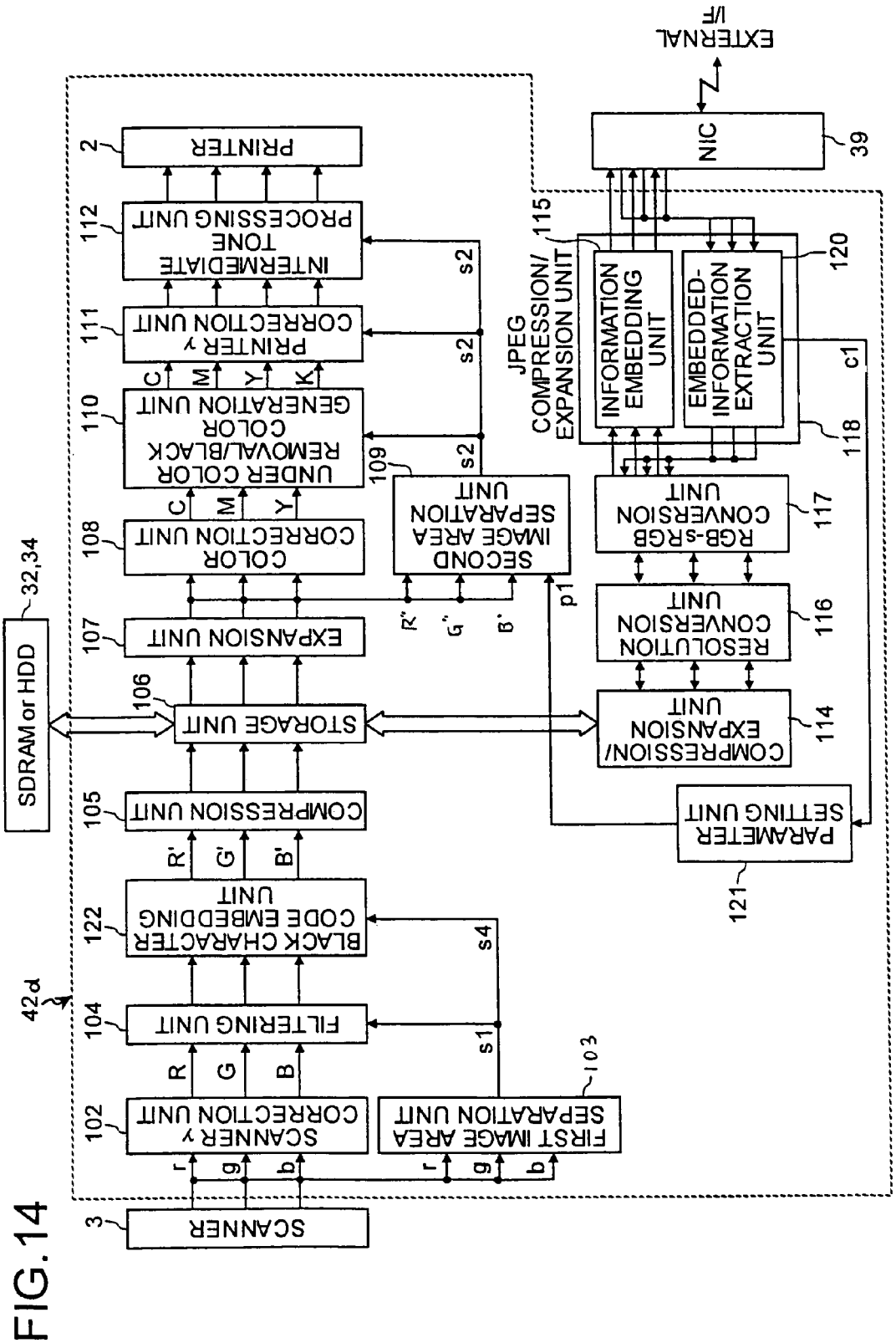
FIG. 14 is a block diagram illustrating the structure of an image processing section in an MFP according to a fourth embodiment of the present invention.

FIG. 14 is a block diagram of an image processing section 42d according to the fourth embodiment. The image processing section 42d differs from the image processing sections of the first to third embodiments in that information is embedded after resolution conversion in the resolution conversion unit 116 and conversion, such as sRGB conversion in the RGB-sRGB conversion unit 117 are performed. That is, the image processing section 42d has the information embedding unit 115 and the embedded-information extraction unit 120 inside the JPEG compression/expansion unit 118.

In the image processing section 42d, a watermark process is performed on a coefficient signal after discrete cosine transform (hereinafter, "DCT") inside the JPEG compression/expansion unit 118 and quantization, and then information is embedded in a frequency area. Available as a method of embedding information in a frequency area are the method which uses discrete Fourier conversion (Ohnish, Oka, and Matsui, "Method of watermark signature to an image by PN sequence", SCIS' 9726B, January in 1997), the method which uses discrete wavelet conversion (Ishizuka, Sakai, and Sakurai, "Empirical contemplation on the security and reliability of electronic watermark technology using wavelet conversion", SCIS' 97-26D, January in 1997), and "Digital watermark based on wavelet conversion—Robustability to image compression and conversion—" by Inoue, Miyazaki, Yamamoto, and Katsura, SCIS' 98-3.2.A, January in 1998) besides the method which uses discrete cosine conversion (Nakamura, Ogawa, and Takashima, "Method for electronic watermark in a frequency area to protect the copyright of digital images", SCIS' 97-27A, January in 1997). The fourth embodiment employs DCT in the process of JPEG compression.

The structure can detect the degree of alteration in the processing and edition done in the PC 6 as the external device. As the processes in the resolution conversion unit 116, the RGB-sRGB conversion unit 117, the JPEG compression/expansion unit 118, etc. are designated by a user operating the operation panel P, it is possible to specify the degrees of alteration by gathering data for those processes beforehand. Therefore, the parameter should be set in consideration of the degree of alteration in the PC 6 as the external device.

The information embedding unit 115 should be constructed in such a way that the contents of the setting in the resolution conversion unit 116, the RGB-sRGB conversion unit 117, the JPEG compression/expansion unit 118 are embedded in addition to information for determining the degree of alteration of an image. This structure can extract the format conversion parameter at the time of outputting and the degree of alteration in the PC 6 as the external device from the re-input signal, so that the optimal parameter can be selected.

As the degree of alteration of an image to be extracted can be limited to the alteration of an image in the PC 6 as the external device, the image alteration done in the PC 6 as the external device can be determined accurately. This can improve the precision in parameter optimization.

Although a single MFP 1 is used as an image processing section in the individual embodiments, the mode is not limited to this particular case. For example, the present invention may be adapted to a system which comprises a plurality of image processing apparatuses and distributes various functions to the image processing apparatuses. In this case, after one image processing apparatus transfers image data to the PC 6 as the external device, the image data is input to another image processing apparatus from the PC 6.

According to an image processing apparatus of one aspect of the present invention, when decision information for the degree of alteration of an image is embedded in an image signal by the information embedding unit before transferring the image signal to the external device and the image signal is re-input from the external device, the decision information for the degree of alteration of the image embedded in the image signal is extracted, and the degree of alteration of the image is determined based on the extraction result to optimize the image processing parameter. This enable to permit the optimal image processing parameter to be used for the image signal which is re-input from the external device, thus ensuring image reproduction with a high image quality.

Moreover, the degree of alteration of the spatial frequency characteristic of the re-input image can be detected and processes, such as filtering and optimization of the parameter for image area separation can be performed, thus ensuring image reproduction with a high image quality.

Furthermore, the degree of alteration of graininess of the re-input image can be detected.

Furthermore, the degree of alteration of the image density of the re-input image can be detected and processes, such as γ conversion and optimization of the parameter for image area separation can be performed, so that image reproduction can be carried out with a high image quality.

Moreover, information for determining the degree of alteration of the image can be embedded at an arbitrary position, so that the information can be embedded at a position which is not noticeable to a user. Accordingly, even if an image transferred to an external device is referred to, it is possible to prevent a user from recognizing decision information for the degree of alteration of the image except for the original image.

Furthermore, decision information for the degree of alteration of an image can be embedded easily.

Moreover, even if an image transferred to an external device is referred to, it is possible to prevent a user from recognizing embedded information for the original image.

Furthermore, even if one piece of information is lost by image edition or the like, watermark information embedded by another method can be extracted, so that image reproduction with a high image quality can be maintained.

Moreover, as the degree of alteration of an image to be extracted can be limited to image alteration in an external device and the alteration in the external device can be determined accurately, so that the precision in parameter optimization can be improved.

Furthermore, because the degree of alteration can be determined in such a form that both image alteration which is made in the resolution conversion, compression or the like which is executed at the time the image is transferred to the external device and image alteration which is done in the external device are reflected, reproduction with a high image quality can be realized with the parameter unitarily set.

According to an image processing apparatus of another aspect of the present invention, when density level information and pixel position information indicating where the density level information is embedded are embedded in an image signal by the information embedding unit before transferring the image signal to the external device and the image signal is re-input from the external device, the density level information and the pixel position information embedded in the image signal are extracted, and it is determined based on the extraction result how the density level of the pixel has been changed to thereby optimize the image processing parameter according to a change in density level. Accordingly, the optimal image processing parameter can be used for the image signal which is re-input from the external device, so that image reproduction with a high image quality can be performed.

Moreover, the density level of a pixel at the position corresponding to the pixel position information can be detected easily.

According to an image processing apparatus of still another aspect of the present invention, before an image signal is transferred to the external device, the total number of pixels belonging to a predetermined image attribute is embedded into the image signal by the information embedding unit, and when the image signal is re-input from the external device, it is determined how the image has been altered based on the total number of pixels belonging to the predetermined image attribute embedded in the extracted number of pixels at the time of embedding and the present number of pixels calculated in the second image area which functions as the pixel counting unit, thereby optimizing the image processing parameter. This can allow the optimal image processing parameter to be used for the image signal re-input from the external device, and thus ensure image reproduction with a high image quality.

Moreover, as decision information for the degree of alteration of an image is embedded in an image signal by the information embedding unit before transferring the image signal to the external device, when the image signal is re-input from the external device, the optimal image processing parameter can be used for the image signal which is re-input from the external device by extracting the decision information for the degree of alteration of the image embedded in the image signal, thus ensuring image reproduction with a high image quality.

Furthermore, when the image signal is re-input from the external device, the decision information for the degree of alteration of the image embedded in the image signal is extracted, and the degree of alteration of the image is determined based on the extraction result to optimize the image processing parameter. This can permit the optimal image processing parameter to be used for the image signal which is re-input from the external device, thus ensuring image reproduction with a high image quality.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
an information embedding unit that embeds, into an image signal, decision information that is information about a specific parameter of art image, wherein the decision information is information about degree of alteration of a spatial frequency characteristic of the image;
an image-signal transmission unit that sends to an external device the image signal with the decision information;
an image-signal reception unit that receives from the external device the image signal with the decision information;
an embedded-information extraction unit that extracts the decision information from the image signal received;
a parameter setting unit that determines degree of alteration of the image based on the decision information extracted and sets an image processing parameter based on the degree of alteration determined; and
an image processing unit that subjects the image signal received to image processing based on the image processing parameter set.

2. The image processing apparatus according to claim 1, wherein the information embedding unit embeds the decision information in an image signal that has been subjected to image processing that includes any one of a resolution conversion process and a compression process in the image processing unit, and the parameter setting unit sets the image processing parameter based on both a parameter adjustment value according to contents of the image processing performed by the image processing unit and a parameter adjustment value according to the degree of alteration of the image based on the decision information extracted.

3. The image processing apparatus according to claim 1, wherein the information embedding unit embeds the decision information in an image signal that has been subjected to image processing that includes any one of a resolution conversion process and a compression process in the image processing unit, and the embedded-information extraction unit that extracts the decision information from the image signal subjected to a process of resolution conversion to an original resolution and an expansion process.

4. An image processing apparatus comprising:

an information embedding unit that embeds, into an image signal, information about density level of a predetermined pixel of an image and information about a position where the information about density level is embedded in the image signal;

an image-signal transmission unit that sends to an external device the image signal with the information about the density level and the information about the position;

an image-signal reception unit that receives from the external device the image signal with the information about the density level and the information about the position;

an embedded-information extraction unit that extracts the information about the density level and the information about the position from the image signal received;

a density-level detection unit that detects a present density level of the predetermined pixel at a position corresponding to the information about the position based on the information about the position extracted;

a parameter setting unit that determines degree of alteration of an image density of the image based on the present density level detected by the density-level detection unit and the information about the density level extracted by the embedded-information extraction unit, and sets an image processing parameter based on the degree of alteration determined; and an image processing unit that subjects the image signal received to image processing based on the image processing parameter set.

5. The image processing apparatus according to claim 4, wherein the predetermined pixel is a pixel of a white background level.

6. The image processing apparatus according to claim 4, wherein the predetermined pixel is a black character pixel on a white background.

7. The image processing apparatus according to claim 4, wherein the predetermined pixel is a while pixel adjoining a black character on a white background.

8. An image processing apparatus comprising:

an information embedding unit that embeds, into an image signal a number that is a total number of pixels that have a predetermined image attribute in an image;

an image-signal transmission unit that sends to an external device the image signal with the number embedded;

an image-signal reception unit that receives from the external device the image signal with the number embedded;

an embedded-information extraction unit that extracts the number from the image signal received;

an image area separation unit that separates pixels that have the predetermined image attribute;

a pixel counting unit that calculates a total of the pixels separated by the image area separation unit as a present total;

a parameter setting unit that determines degree of alteration of the image based on the present total calculated by the pixel counting unit and the number extracted by the embedded-information extraction unit, and sets an image processing parameter based on the degree of alteration determined; and an image processing unit that subjects the image signal received to image processing based on the image processing parameter set.

9. An image processing apparatus comprising:

an image-signal reception unit that receives from an external device an image signal in which decision information that is information about a specific parameter of an image is embedded, wherein the decision information is information about degree of alteration of a spatial frequency characteristic of the image;

an embedded-information extraction unit that extracts the decision information from the image signal received;

a parameter setting unit that determines degree of alteration of the image based on the decision information extracted and sets an image processing parameter based on the degree of alteration determined; and an image processing unit that subjects the image signal received to image processing based on the image processing parameter set.

10. A method of processing image, comprising:

embedding into an image signal, decision information that is information about a specific parameter of an image, wherein the decision information is information about degree of alteration of a spatial frequency characteristic of the image;

sending to an external device the image signal with the decision information;

receiving from the external device the image signal with the decision information;

extracting the decision information from the image signal received;

determining degree of alteration of the image based on the decision information extracted and setting an image processing parameter based on the degree of alteration determined; and subjecting the image signal received to image processing based on the image processing parameter set.

11. An image processing apparatus comprising:

an information embedding unit that embeds, into an image signal, decision information that is information about a specific parameter of an image, wherein the decision information is information about degree of alteration of the image and pixel position information that indicates where the decision information is embedded into the image signal;

an image-signal transmission unit that sends to an external device the image signal with the decision information;

an image-signal reception unit that receives from the external device the image signal with the decision information;

an embedded-information extraction unit that extracts the decision information from the image signal received, wherein the embedded-information extraction unit extracts the pixel position information, and then extracts the decision information based on the pixel position information;

a parameter setting unit that determines degree of alteration of the image based on the decision information extracted and sets an image processing parameter based on the degree of alteration determined; and an image processing unit that subjects the image signal received to image processing based on the image processing parameter set.

12. The image processing apparatus according to claim 11, wherein the decision information is a predetermined analysis pattern.

13. The image processing apparatus according to claim 12, wherein the decision information is embedded is embedded in an image area where it is hard for s user to recognize the analysis pattern.

14. The image processing apparatus according to claim 13, wherein the decision information is embedded in a mesh image area.

15. The image processing apparatus according to claim 12, further comprising an image area separation unit that identifies areas in the image, and the information embedding unit embeds the decision information in accordance with the areas identified.

16. The image processing apparatus according to claim 11, wherein the decision information is numerical information representing a status of the image before the decision information is embedded.

17. The image processing apparatus according to claim 11, wherein the decision information is numerical information representing a status of the image before the decision information is embedded and information about position where the numerical information is embedded, and the information embedding unit embeds the decision information as an electronic watermark.

18. The image processing apparatus according to claim 17, wherein the information embedding unit embeds the decision information as a plurality of electronic watermarks of respectively different durability and characteristics.

19. An image processing apparatus comprising:

an image-signal reception unit that receives from an external device an image signal in which decision information that is information about a specific parameter of an image is embedded, wherein the decision information is information about degree of alteration of the image and pixel position information that indicates where the decision information is embedded into the image signal;

an embedded-information extraction unit that extracts the decision information from the image signal received, wherein the embedded-information extraction unit extracts the pixel position information, and then extracts the decision information based on the pixel position information;

a parameter setting unit that determines degree of alteration of the image based on the decision information extracted and sets an image processing parameter based on the degree of alteration determined; and an image processing unit that subjects the image signal received to image processing based on the image processing parameter set.

20. A method of processing image, comprising:

embedding into an image signal, decision information that is information about a specific parameter of an image, wherein the decision information is information about degree of alteration of the image and pixel position information that indicates where the decision information is embedded into the image signal;

extracting the pixel position information, and then extracting the decision information based on the pixel position information;

sending to an external device the image signal with the decision information;

receiving from the external device the image signal with the decision information;

extracting the decision information from the image signal received;

determining degree of alteration of the image based on the decision information extracted and setting an image processing parameter based on the degree of alteration determined; and subjecting the image signal received to image processing based on the image processing parameter set.

* * * * *